Oct. 19, 1948.　　　R. R. CURTIS　　　2,451,925
PUMP VALVE CONSTRUCTION
Filed March 26, 1943　　　2 Sheets-Sheet 1
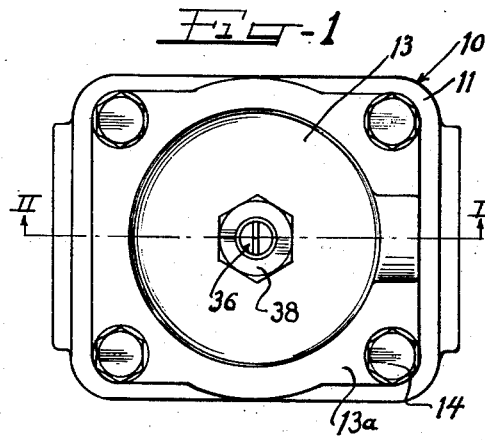
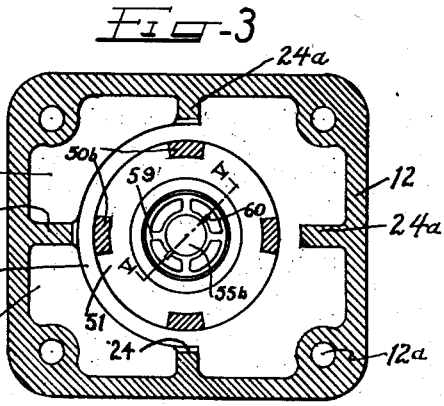
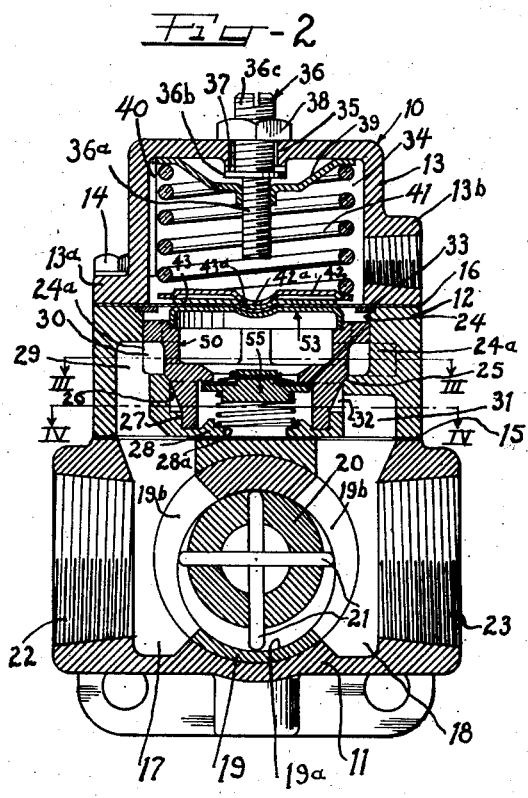
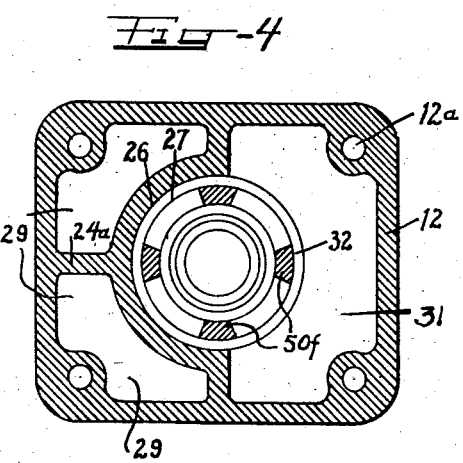
Inventor
Russell R. Curtis.
By Charles W. Hills

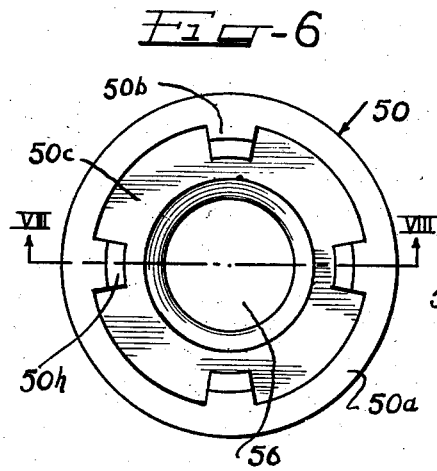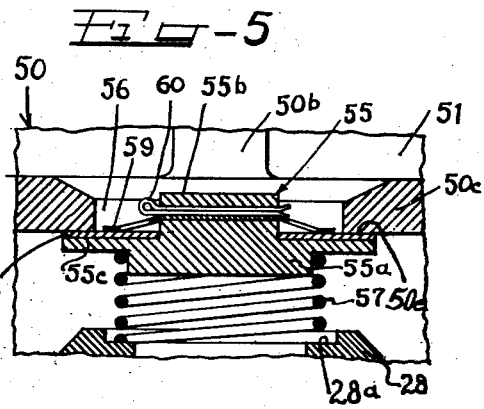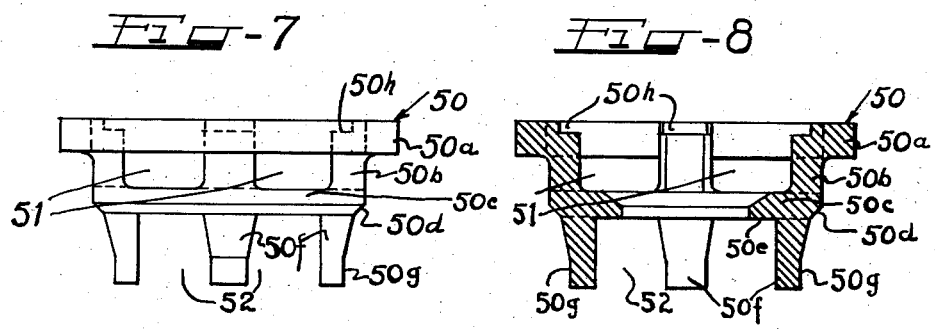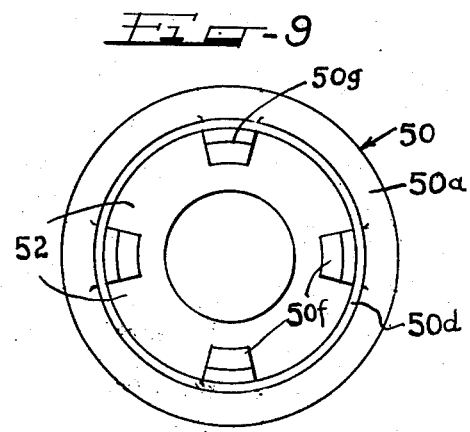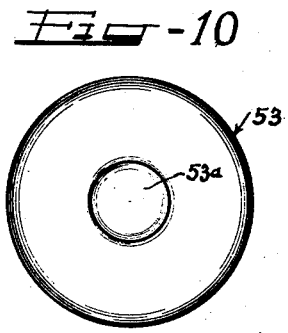

Patented Oct. 19, 1948

2,451,925

UNITED STATES PATENT OFFICE 2,451,925

PUMP VALVE CONSTRUCTION

Russell R. Curtis, Dayton, Ohio, assignor to Curtis Pump Company, Dayton, Ohio, a corporation of Ohio Application March 26, 1943, Serial No. 480,647

4 Claims. (Cl. 277—45)

This invention relates to a by-pass and relief valve construction adapted for by-passing fluid from the inlet to the discharge side of a pump and for relieving fluids from the discharge to the inlet side of the pump.

Specifically the invention relates to a one-piece relief valve adapted to be made of molded plastic material or metal having external annular guide surfaces at the top and bottom thereof, an intermediate external valve face and an internal valve seat.

The invention will hereinafter be specifically described as embodied in an airplane engine positive displacement fuel pump but it should be understood that the invention is not limited to such usage, being generally applicable to valve assemblies.

In airplane fuel systems it is customary to supply fuel to the engine carburetor under pressure from a series or tandem arrangement of pumps and to provide such pumps with by-pass means so that fuel can be received by the engine even when only one of the pumps is operating. It is also highly important in such systems that fuel fed to the carburetor be maintained at a constant pressure differential above either the ambient air pressure or the engine intake manifold pressure. For this reason, positive displacement pumps in such systems are equipped with relief valves capable of relieving excess pump pressures from the discharge to the intake side of the pump and also capable of by-passing fuel from the intake to the discharge side of the pump. The relief valve is urged toward closed position by a spring which can be set to maintain the desired differential pressure at the discharge side of the pump.

In order to balance the relief valve against variations in inlet pressures and compensating variations in pump discharge pressure and base pressure (ambient air pressure or engine intake manifold pressure) a diaphragm is provided. This diaphragm is interposed between the spring acting on the relief valve, and the valve so that the spring acts on the valve through the diaphragm and the diaphragm will move with the relief valve. One side of the diaphragm has an effective area exposed to base pressure balanced by an equal relief valve area exposed to pump discharge pressure. In addition, the other side of the diaphragm is exposed to inlet pressure in the pump and the area so exposed and tending to move the relief valve in one direction is balanced by an equal area on the relief valve assembly tending to move the relief valve in the other direction.

Thus a balanced relief valve assembly is provided and the selected spring pressure acting on said assembly will determine the pump discharge pressure differential above a base pressure such as, for example, the ambient air pressure or the engine intake manifold pressure.

According to this invention in pump casing, a valve casing, and a spring casing are assembled in superimposed position with a diaphragm between the spring and valve casing separating the chambers of said casings. The valve casing has coaxial bores therein connected through an annular valve seat and communicating respectively with the inlet and outlet sides of the pump on opposite sides of the valve seat. A relief valve is mounted in the bores of the valve casing and has external guide surfaces slidably engaging said bores. This valve has an intermediate annular valve face adapted to seat on the valve seat between the bores.

The relief valve is provided with an internal shoulder intermediate the ends thereof forming a seat for a by-pass valve which is spring urged against this interior seat by a spring bottomed on a bottom wall of the casing at the end of the bores. Ports are provided in the relief valve joining the interior thereof with the inlet and outlet sides of the pump on opposite sides of the annular valve face thereof.

The by-pass valve can be composed of plastic or metal and has a synthetic rubber impregnated fabric cover adapted to engage the internal seat of the relief valve. This cover can be held in place on the by-pass valve by means of a spring washer. The fabric cover eliminates the necessity for lapping the engaging surfaces to form a tight seal when the valve is closed.

It is, then, an object of this invention to provide a one-piece relief valve construction adapted for pumps which has an external annular valve face and an internal valve seat.

Another object of the invention is to provide a plastic relief valve and by-pass valve assembly adapted for pumps.

A further object of the invention is to provide a pump valve construction embodying a valve housing having coaxial bores communicating through an annular valve seat together with a relief valve having external guide surfaces slidably engaging said bores and an intermediate valve face adapted to seat on said annular seat together with an internal valve seat and a by-pass valve spring urged toward said seat.

A further object of the invention is to provide a by-pass valve adapted for pumps having a resilient seating face thereby avoiding the necessity for lapping said face against a valve seat to insure a good seal.

A further object of the invention is to provide a valve assembly composed of a one-piece open ended member with ports in the side walls thereof, an annular valve face intermediate the ends thereof, an internal valve seat intermediate the ends thereof and a by-pass valve cooperating with said seat.

A still further object of the invention is to provide a simple, inexpensive by-pass and relief valve assembly for airplane fuel pumps adapted to be composed of molded plastic material.

Other and further objects of the invention will be apparent to those skilled in the art from the following detailed description of the annexed sheets of drawings which, by way of a preferred example only, illustrates one embodiment of the invention.

On the drawings:

Figure 1 is a top plan view of an airplane fuel pump embodying a valve construction according to this invention.

Figure 2 is a vertical cross-sectional view, taken along the line II—II of Figure 1.

Figure 3 is a horizontal cross-sectional view, taken along the line III—III of Figure 2.

Figure 4 is a horizontal cross-sectional view, taken along the line IV—IV of Figure 2.

Figure 5 is an enlarged fragmentary vertical cross-sectional view taken along the line V—V of Figure 3.

Figure 6 is an enlarged top plan view of the relief valve of this invention.

Figure 7 is an enlarged side elevational view of the relief valve.

Figure 8 is a vertical cross-sectional view taken along the line VIII—VIII of Figure 6.

Figure 9 is an enlarged bottom plan view of the relief valve.

Figure 10 is a top plan view of a cup for seating in the relief valve to transmit spring pressure to the valve.

As shown on the drawings:

In Figures 1 and 2 the reference numeral 10 designates generally a fuel pump including a pump casing 11, a valve casing 12, and a spring casing 13 all held together in superimposed relation by means of four bolts or studs 14 extending respectively through an outturned flange 13a at the base of the casing 13, apertures 12a of the casing 12 (Figures 3 and 4) into tapped holes (not shown) of the pump casing 11.

A gasket 15 is positioned between the casings 11 and 12 and a flexible diaphragm 16 composed of synthetic rubber-impregnated fabric or synthetic rubber sheet material is disposed between the casings 12 and 13.

The casing 11 has an inlet chamber 17 and an outlet chamber 18 on opposite sides of a cylindrical sleeve 19 which is press-fitted into the casing. This sleeve 19 defines, with its inner surface 19a, a pump bore for a rotary vane pump. The sleeve 19 has ports 19b in the sides thereof joining the bore 19a with the chambers 17 and 18.

A rotor 20 is eccentrically mounted in the sleeve 19 and has pumping vanes 21 slidable therethrough and engaging the pump bore 19a. The rotor and vanes will pump fluid from the inlet chamber 17 to the outlet chamber 18.

Internally threaded hollow bosses 22 and 23 project laterally from the chambers 17 and 18 respectively. The bosses are adapted to receive fuel lines therein.

The valve casing 12 has a cylindrical bore 24 extending inwardly from the top end thereof and continued by the inner ends of four webs 24a (Figure 3) to terminate in an annular valve seat 25. The four webs are used instead of continuing the bore 24 as a full cylindrical wall to the seat 25 for the purpose of decreasing weight and for producing an enlarged annular chamber around the relief valve beneath the upper guide wall of this valve as will more fully hereinafter be described.

A reduced diameter bore 26 coaxial with the bore 24 extends downwardly from the valve seat 25 to terminate in a further reduced diameter coaxial bore 27 which is bottomed by an apertured bottom wall 28 seated on the gasket 15. The bottom wall 28 has a recess 28a around the mouth of the aperture therein providing a shoulder.

The casing 12 has a vertical passageway 29 therein on each side of one web 24a communicating through a port 30 with the interior of the bore 24 to join this bore with the inlet chamber 17 of the pump. The casing 12 also has a passageway 31 communicating through a port 32 with the interior of the bore 26 and joining this bore with the discharge chamber 18 of the pump.

The bore 24 is counterbored at the upper end thereof to receive an annular metal washer 33 which partially overlies the bore 24. The washer 33 receives the diaphragm 16 thereover and determines the effective area of the diaphragm exposed to pump inlet pressures.

The casing 13 is in the form of an inverted cup with an internally tapped hollow boss 13b in the side wall thereof adapted to vent the spring chamber 34 defined by the casing 13 above the diaphragm 16 either to the ambient air or to the airplane engine intake manifold (not shown).

The diaphragm 16 separates the spring chamber 34 from the bore 24.

The top wall of the casing 13 has a central aperture 35 therethrough receiving, in rotatable relation therein, a post member 36 with a threaded shank portion 36a depending into the chamber 34, an outturned collar portion 36b bottoming a packing 37 and a threaded portion 36c projecting freely through the aperture 35 and extending above the casing 13 to receive a nut 38 thereon. The nut 38 can be tightened to compress the packing 37 between the collar 36b and the top wall of the casing.

The threaded shank portion 36a of the post 36 receives, in threaded relation therearound, a spring retainer 39 having a notch in the periphery thereof receiving a vertical key 40 provided in the casing 13.

The end of the post has a screwdriver slot therein to facilitate rotation of the post for moving the retainer 39 along the threaded shank portion 36a thereof. The key 40, by being seated in a notch on the periphery of this retainer 39, will prevent rotation of the retainer so that the retainer will be moved up and down in the casing upon reverse rotation of the post. The rotation of the post can be prevented by tightening the nut 38 so as to clamp the collar 36b against the packing 37.

A coiled spring 41 is provided in the casing 13 between the retainer 39 and a bottom retainer 42. This bottom retainer 42 has a central rounded protuberance 42a seated in a rounded depression 43a of a washer 43 which overlies the central portion of the diaphragm 16. The depression 43a of the washer also forms a rounded protuberance on the bottom face of the washer which depresses the central portion of the diaphragm to prevent side movement of the spring assembly on the diaphragm.

In accordance with this invention a one-piece relief valve and by-pass valve seat member 50 is slidably mounted in the casing 12. As shown in Figures 6 to 9, this member 50 can be composed of die cast metal or molded plastic material such as a solvent and temperature-resisting synthetic resin, hard synthetic rubber, or the like. The member 50 is in the form of an open-ended stepped sleeve which can be molded or cast using easily mounted opposed plugs or cores. The molded or cast product need not be machine-finished except possibly to remove flashing or burrs from working surfaces thereof.

The valve 50 has a circular outturned flange 50a around the upper end thereof slidably engaging the bore 24 of the casing 12 and a cylindrical wall 50b depending from the inner end of said flange to be disposed in spaced relation inwardly from the inner ends of the webs 24a and thus operate in spaced relation inwardly from the side walls of the enlarged chamber provided below the bore 24. The wall 50b terminates in an inwardly extending base 50c providing an annular valve face 50d therearound adapted to seat on the seat 25 at the bottom of the bore 24.

This wall 50c has a central aperture therethrough with an annular bottom face 50e providing a by-pass valve seat.

Four legs 50f depend from the wall 50c intermediate the face 50e and the seat 50d provided thereby. These legs 50f have end portions with segmental cylindrical outer faces 50g slidably received in the bore 27 of the casing. The legs preferably taper down to these end portions 50f and the tapered parts of the legs are spaced inwardly from the bore 26 of the casing.

The side wall 50b has four elongated ports 51 therearound so that actually the side wall for a greater part of its depth is only composed of four upstanding leg portions, as shown in Figure 3. The ports 51 connect the enlarged annular chamber below the bore 24 of the casing 12 with the interior of the member 50.

The four legs 50f of the member 50 provide four elongated ports 52 therebetween. The ports 52 join the bore 27 of the casing 12 with the interior of the member 50 beneath the by-pass valve seat 50e.

The open top end of the member 50 has internal shoulders 50h (Figures 6 to 8) between the ports 51 for bottoming a cup 53 (Figure 10) having a central depression 53a receiving the central portion of the diaphragm 16 depressed by the rounded protuberance of the washer 43 as shown in Figure 2. This depresion 53a prevents slippage of the washer 43 so that the spring always exerts its pressure through the rounded bead 42a centrally on the diaphragm and centrally on the relief valve member 50.

As best shown in Figure 5, a by-pass valve 55 in the form of a flat disk of molded plastic material, metal or the like, is mounted in the lower portion of the relief valve 50 to close the by-pass aperture 56 in the wall 50c of the member. The by-pass valve 55 has a downwardly extending circular boss portion 55a receiving a light coil spring 57 therearound. The coil spring 57 is bottomed in the recess 28a on the shoulder thereby provided in the bottom casing wall 28.

The by-pass member 55 also has an upstanding boss portion 55b projecting centrally through the aperture 56. The boss portion 55b has a transverse cotter pin receiving hole therethrough.

The by-pass valve member 55 has a flat annular top face 55c around the boss portion 55b receiving thereon a synthetic rubber-impregnated fabric washer 58. The washer is held in position on the flat face 55c by a dished metal spring washer 59 disposed around the boss 55b and held in stressed condition on top of the washer 58 by means of a cotter pin 60 extended through the hole provided in the boss portion 55b.

The washer 58, being somewhat resiliently yieldable, can have good sealing engagement with the seat 50e without the necessity of a lapping or grinding operation which would be necessary in the event that two metal surfaces, two hard plastic material surfaces, or a hard plastic material and a metal surface were seated directly against each other.

The relief valve 50 can move in response to differential pressures on the discharge side of the pump 18 based on the pressure existing in the chamber 34 toward and away from its seat 25, for the distance between the top of the valve and the washer 33 as shown in Figure 2. Thus the discharge pressure of the pump acts on the bottom face of the wall member 50c and on the bottom face of the by-pass valve 55 tending to force the relief valve face 50d off its seat 25. This action is resisted by the spring 41 which can be adjusted by the post 36 to exert a selected pressure through the diaphragm and cup 53 on the upper end of the relief valve. When the relief valve is opened, fuel from the discharge side of the pump is relieved back to the inlet side of the pump through the passageway 31, port 32, bore chamber 26, enlarged chambers below the bore 24, port 30, and passageways 29.

In the event that the pump is not delivering the desired pressure, or is not operating, fuel in the inlet chamber 17 of the pump can be by-passed around the pump through the by-pass valve aperture 56 forcing the by-pass valve off its seat 50e. The fuel will thus flow from the chamber 17 through the passageways 29, port 30 into the enlarged chamber below the bore 24, thence through the ports 51 into the relief valve, then through the aperture 56 past the by-pass valve 55 into the lower portion of the relief valve, next through the ports 52 in this lower portion of the relief valve and into the bore 26, then through port 32 into the passageway 31 and thence to the outlet chamber 18.

From the above descriptions it will be evident that this invention now provides a pump assembly having a one-piece relief member providing not only a relief valve but also a seat for a by-pass valve. A by-pass valve is seated in the relief member and is spring-urged by a light spring against this seat of the relief member. Yieldable resilient means mounted on the by-pass valve eliminate the necessity for lapping the seating surfaces into sealing contact. The relief member is guided by external cylindrical guides at the top and bottom thereof which are slidably received in cylindrical bores of a valve casing portion of the pump to prevent cocking of the relief member. The side walls of the relief member between the top and bottom guides operate in spaced relation from the side walls of surrounding chambers (chamber below bore 24 and bore 26) so that free fluid passage to the ports of the relief member is always permitted. The relief member and the by-pass valve can conveniently be molded from synthetic plastic material or die-cast or die-forged from metal.

It will, of course, be understood that various details of construction may be varied through a wide range without departing from the principles of this invention and it is, therefore, not the purpose to limit the patent granted hereon otherwise than necessitated by the scope of the appended claims.

I claim as my invention:

1. A relief and by-pass valve assembly comprising an open-ended sleeve having an outturned annular guide flange around one end thereof, a plurality of axially extending legs at the other end thereof having external guide faces, and an intermediate wall portion providing an external valve face and an internal valve seat, said sleeve having ports therethrough between the annular guide flange and the intermediate wall portion, said axially extending legs being disposed at spaced intervals around said sleeve and providing enlarged ports therebetween, a by-pass valve in said sleeve slidably guided by said legs and coacting with said internal seat portion of the intermediate wall to control flow through the sleeve, said end of the sleeve containing the guide flange having a recess therein with a shoulder at the inner end thereof, an inverted cup having the side wall portion thereof seated in said recess and bottomed on said shoulder, said cup having an end wall closing one end of the sleeve and provided with a central depression therein, a diaphragm overlying said wall of the cup, a washer overlying said diaphragm and having a protuberance deflecting the diaphragm into said depression in the end wall of the cup, and a spring acting on said washer to seat the protuberance thereof in the localized depressed portion of the diaphragm, said washer being tiltable about said protuberance whereby the spring load of said spring will be centered on said protuberance to act on the central portion of the cup for relieving the sleeve of any forces tending to tilt the same.

2. A valve construction comprising a valve casing having a top bore at the upper end thereof, a coaxial intermediate bore, an annular valve seat between said top bore and said intermediate bore and a reduced diameter coaxial blind bore at the bottom of said intermediate bore, a spring casing superimposed on said valve casing, a flexible diaphragm between said spring casing and said valve casing separating the top bore of the valve casing from the spring chamber provided by the spring casing, a relief valve having an external surface slidably engaging the top bore of the valve casing together with a second external surface slidably engaging the blind bore of the valve casing, said relief valve having an annular valve face intermediate said guide surfaces cooperating with said valve seat between the top bore and the intermediate bore, means defining a by-pass valve seat in said relief valve, a by-pass valve cooperating with said seat in the relief valve, a spring bottomed on said blind bore acting on the by-pass valve to urge the same against the seat in the relief valve, a cup member bottomed in the top of said relief valve having a central depression therein, a spring-urged member in the spring casing having a protuberance pressing the diaphragm into the central depression of the cup member, and an adjustable spring in said spring casing acting on said spring-urged member to urge the relief valve toward the seat between the top bore and the intermediate bore.

3. A valve construction adapted to relieve fluid from the discharge to the intake side of a pump and adapted to by-pass fluid from the intake to the discharge side of the pump which comprises a housing having an inlet and an outlet, coaxial bores separated by a valve seat and communicating respectively with the inlet and outlet of said housing, an open-ended sleeve slidably mounted in said bores having an annular valve face intermediate the ends thereof adapted to engage said seat, said valve having an internal annular shoulder forming a by-pass valve seat, a by-pass valve in said sleeve adapted to engage said seat, said sleeve having ports connecting said bores with the interior thereof on opposite sides of said by-pass valve, an inverted cup seated in the end of the sleeve remote from the by-pass valve and closing said end, said cup having a depression in the central portion of its end closing wall, and spring urged means seated in said depression to center spring loads on the sleeve.

4. A one piece combined relief valve and by-pass valve seat which comprises an annular wall, upstanding legs extending from one face of said wall at spaced intervals from the periphery of said face, an annular flange surrounding said legs in spaced relation from said wall, said annular flange having an external guide surface, a plurality of legs depending from the opposite face of said wall at spaced intervals intermediate the inner and outer peripheral edges of the wall, said depending legs having external guide surfaces at their extremities, said wall defining a valve seat inside of said depending legs and a valve seating face surrounding said depending legs, said upstanding legs having recesses in their end faces thereof bottomed by supporting shoulders, and an inverted cup having the side wall thereof snugly seated in said recesses and supported on said shoulders, said cup having an end wall closing one end of the valve.

RUSSELL R. CURTIS.

REFERENCES CITED

The following references are of record in the file of this patent:

UNITED STATES PATENTS

| Number | Name | Date |
|---|---|---|
| 1,625,367 | Kennon | Apr. 19, 1927 |
| 1,828,967 | Hewitt | Oct. 27, 1931 |
| 1,973,258 | Jensen | Sept. 11, 1934 |
| 2,263,091 | Johnson | Nov. 18, 1941 |
| 2,268,807 | Curtis | Jan. 6, 1942 |
| 2,295,774 | Corydon | Sept. 15, 1942 |
| 2,299,079 | Davis | Oct. 20, 1942 |
| 2,353,545 | Caserta | July 11, 1944 |